Oct. 12, 1965   N. C. NIKITAS   3,211,463

CHUCKS

Filed Oct. 2, 1963

INVENTOR.
NICK C. NIKITAS
BY HIS ATTORNEY
Maurice R. Boiteau

United States Patent Office 3,211,463
Patented Oct. 12, 1965

3,211,463
CHUCKS
Nick C. Nikitas, Danvers, Mass.
(P.O. Box 107, Salem, Mass.)
Filed Oct. 2, 1963, Ser. No. 313,335
6 Claims. (Cl. 279—4)

This invention relates to improvements in chucks for holding work pieces upon which such operations as metal working are being carried out. More particularly the invention relates to chucks operated by fluid whether in the gaseous or liquid state.

In one aspect, the present invention is directed to a collet opening and closing mechanism which is fluid operated and in which the collet is in the form of a rubber flex collet such as those commercially available from Jacobs Chuck Co. and disclosed in United States Letters Patent Ser. Nos. 2,346,706 and 2,459,900. By the use of these rubber flex collets it is possible to cover a wide range of work piece diameters with a minimum number of different collets. Thus by the use of ten collets designated J–501 through J–510 it is possible to cover the range from .093 inch to and including 1⅛₆ inch in diameter. The use of rubber flex collets, however, is accompanied by a serious disadvantage if these are subjected to excessive flexure at each operation because their expansion and contraction is not carefully controlled. The result of the excessive flexure of such collets is to reduce their useful life to a small fraction of that attainable with careful usage.

It is accordingly an object of the invention to provide a fluid operated chuck including a rubber flex collet in which the flexure of the collet is carefully controlled to assure a maximum useful life.

Another object of the invention is to provide a collet operating mechanism which provides both a lower height and lighter weight than has heretofore been available for a given range of work piece diameters.

Another object of the invention is to provide a fluid operated collet which may be economically manufactured. A related object is to provide a fluid operated collet chuck characterized by a long trouble-free operating life and in which repairs may be economically accomplished.

The foregoing objects are achieved in a fluid operated chuck comprising an externally tapered rubber flex collet and an internally tapered sleeve pressed forward to cause the collet to close tightly upon the work piece. According to a feature of the invention the sleeve is advanced to close the collet by a plurality of individually guided pistons each of which is piloted to prevent cocking in its cylinder and provided with a return spring. Fluid is introduced to the several pistons through an annular manifold formed in a plate which also acts as a stop for the spring actuated return motion of the pistons.

In order to minimize flexure of the collet in releasing the work piece there is provided, according to another feature of the invention a stop which may be readily and accurately adjusted to limit return motion of the collet closing sleeve. The stop is in the form of a cone point screw radially inserted in the body of the chuck, the cone of which is positioned to engage an outer edge of the sleeve.

The foregoing objects and features of the invention as well as numerous advantages will be clarified from the following description of an illustrative embodiment taken in connection with the accompanying drawings in which, FIG. 1 is a plan view of a fluid operated chuck according to the present invention;

Figure 1:
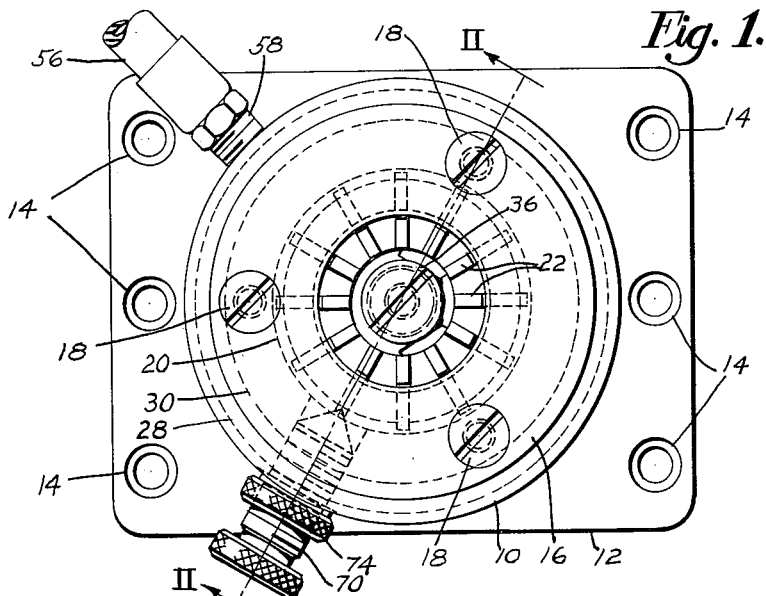

Referring now to the drawings, the chuck, according to the present invention, especially suited for operation by compressed air, comprises a hollow shell 10 formed with an integral rectangular flange 12 having a series of perforations 14 through which the chuck may be bolted to a machine table. At its upper end the shell 10 is formed with a pilot of reduced diameter fitting a counterbore in a cover 16 secured to the shell by means of screws 18.

The shell 10 is internally bored to three different diameters increasing from the smallest at the top to the largest at the bottom. In the smallest diameter there is slidably mounted an internally tapered sleeve 20 in which is received a collet 22. In the drawing, the collet is illustrated as one according to the disclosure of the above-identified patent but it should be appreciated that the collet may also be one of more conventional slotted shell constructions. As shown in FIG. 1, the collet consists of twelve internally and externally ground steel blades held in place by molded rubber connectors and thus capable of being contracted by as much as ⅒ of an inch. The upper end of the collet 22 is of reduced diameter extending through an opening in the cover 16 and providing a shoulder which engages the underside of the cover so as to cause the collet to contract as the sleeve 20 is urged upwardly. Holding the sleeve 20 captive in the shell 10 and retaining it against rotation is a screw 24 threaded into a tapped hole in the shell and projecting into a slot 26 cut in the sleeve 20. The cover 16 is readily removed for changing collets by the mere withdrawal of the screws 18.

Closing the lower end of the central cavity in the shell 10 is a circular plate 28 on which is mounted a block 30 secured to the plate by six equally spaced screws 32 passing loosely through the plate and entering tapped holes in the block. The plate 28 is similarly retained in the shell 10 by screws 33. The plate 28 is centrally perforated to receive a screw 34 the threads of which engage a tapped hole in the block 30. A locator button 36 is tapped at its lower end to be received on the screw 34 while a counterbore in the top of the block accommodates a suitable pilot diameter on the button. In performing operations on work pieces held by the chuck and in which it is desirable to hold the lower end of successive work pieces in exactly the same position, the button 36 provides a rest for the lower end of such work pieces. The button 36 may be varied in both length and diameter to suit work pieces within wide limits.

Figure 2:
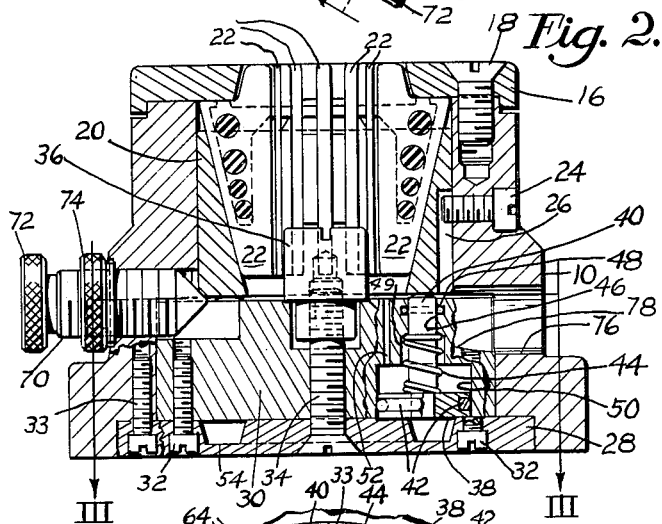
FIG. 2 is a view in vertical section taken along the line II—II of FIG. 1 showing the interior construction of the chuck.

For raising the sleeve 20 to cause the collet 22 to contract about a work piece there are provided six equally spaced pistons to which fluid under pressure is applied from a common manifold. The pistons, one of which is shown in FIG. 2, are conveniently manufactured in two parts consisting of a spool 38 and a pilot 40 to which the spool is affixed. Alternatively each piston could be made in a single part. Each spool 38 is peripherally grooved to receive an O-ring 42 providing a sliding seal between the piston and the cylinder in which it moves. In addition, there is wrapped around the pilot 40 a compression spring 44 which urges the piston to the position shown in FIG. 2 when the source of fluid under pressure is cut off.

Figure 3:
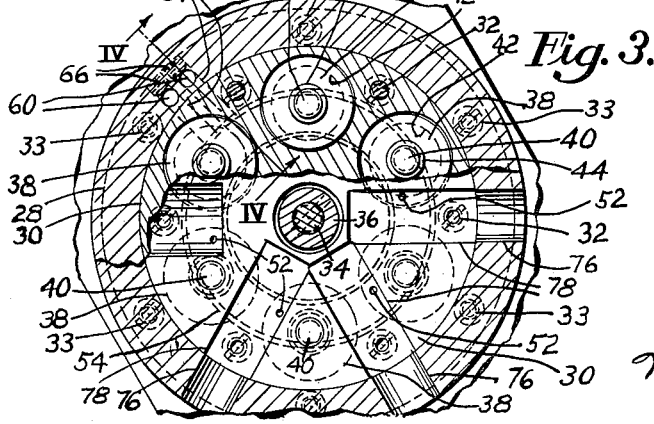
FIG. 3 is a view in horizontal section on the line III—III of FIG. 2, showing an arrangement of openings for the disposal of chips from within the chuck.

Ease of manufacture and durability of the chuck are achieved by the form of cavity in which each of the pistons is mounted. The cavity is one of three diameters including a minor diameter 46 of the top of the block 30, in which the pilot 40 is slidably received. Near the top of the block 30 each opening 46 is undercut to receive an O-ring 48 to prevent the introduction of foreign matter into the piston cavity. The diameter 46 is enlarged in the form of a shallow counterbore 49 to provide a shoulder for and space in which the spring 44 is received when the piston 38-40 is raised. Finally the cavity includes a larger counterbore 50 the wall of which is engaged by the rubber O-ring 42 and the upper end wall of which presents a stop to limit piston motion. Because the wall of the counterbore 50 is engaged by a slightly compressible and readily replaceable O-ring 42, the block 30 may be of a light metal such as aluminum without suffering excessive wear. In order to minimize resistance to piston movement each cylinder is ported as shown in proper angular orientation in FIG. 3 at 52. The sudden escape of air through six ports 52 provides an additional benefit in disposing of chips large enough to be prevented from entering the port but which might interfere with the efficient operation of the sleeve 20. For performing operations producing fine chips which might penetrate into the cylinders through the ports 52 the cylinders may be ported through the shell 10. The flow of chips out of the body of the chuck will be explained later in conjunction with the other features of the construction relating to this problem.

The plate 28 is formed on its upper surface with an annular groove 54 in communication with the underside of the six pistons 38-40 and thus provides a manifold through which the fluid under pressure is introduced. The embodiment depicted in the drawing is most suitable for being operated by means of compressed air and will accordingly be so described. However, it will also be understood that minor modifications well within the skill of the art may be made to the present embodiment to obtain efficient operation by means of a liquid medium. It is also seen that the width of the groove 54 is such that the top surface of the plate 38 serves as a stop when the chuck is inactive. On the other hand when fluid under pressure is introduced into the groove 54 only a part of the area of the piston 38 is initially subjected to the fluid pressure but the force exerted on a part of the face of the piston is sufficient to cause it to rise out of engagement with the top surface of the plate and thus bring the whole area of piston under the influence of the lifting force.

Figure 4:
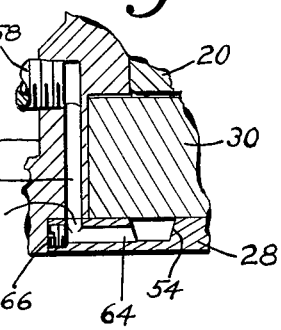
FIG. 4 is a detail view in vertical section taken along the line IV—IV of FIG. 3, showing a passage for the admission of fluid to operate the chuck.

Air under pressure is introduced into the annular groove 54 through a series of passages communicating with a hose 56 terminating in a threaded fitting 58. The hose 56 is connected to a commercially available valve for turning a supply of air on and off. The fitting 58 engages the threads of a tapped hole in the shell 10 as seen in FIG. 4. The tapped hole is in communication with a pair of vertical passages in the shell each of which is in turn in alignment and communication with a vertical opening 62 in the plate 28. A radially oriented passage 64 intersects both a passage 62 and the groove 54 to bring fluid under pressure from the hose 56 to the groove 54 in order to act upon the underside of the six pistons 48-40. For convenience in manufacture each opening 64 is drilled and a threaded plug 66 is provided in the edge of the plate 28.

As has already been indicated the chuck depicted in the drawing may be readily modified for operating by means of a liquid medium rather than air. The modification which will be well understood consists simply of providing a second series of passages like those already described connecting the groove 54 with a second hose similar to the hose 56. The second hose is connected through a two-part valve which drains the liquid displaced by the pistons in returning to their at rest position, back to a sump at the same time that the pressurized liquid is cut off by the other part of the valve. In the case of actuation by air under pressure, the single part valve need only be ported to vent the compressed air from the chuck back to atmosphere.

Because each rubber flex collet to which the present chuck is particularly although not exclusively adapted, is suited to a broad range of work pieces, the release of the work piece could be accompanied by excessive flexure of the rubber connectors between the metal blades or fingers which constitute the work holding means. Such excessive flexure would occur for example when a collet is being employed to hold work pieces having a diameter near the low end of the collet range, if the collet were permitted to expand fully to release the work piece. To avoid excessive flexure there is provided a stop in the form of a large cone pointed screw 70 having a knurled head 72. The threads of the screw 70 engage those of a suitable radially-oriented threaded opening in the shell 10 and there is a check nut 74 provided for locking the screw in its predetermined position. The axis of the screw 70 is positioned slightly below the lower edge of the tapered sleeve 20 corresponding to the fully opened condition of a collet 22 of a set. Accordingly it is a relatively simple operation to actuate the chuck for gripping a first work piece. The screw 70 is then tightened against the sleeve 20 backed off to permit a slight collet releasing motion to the sleeve and locked in position by the nut 74.

In using a chuck for holding a work piece upon which a metal removing operation is being performed it is difficult if not impossible to prevent the introduction of chips into the interior of the chuck. Such accumulations eventually interfere with the operation of the chuck and necessitate its disassembly for cleaning with consequent losses in operating time. In the present chuck, chips entering into the interior are driven out so that excessive accumulations are avoided. For this purpose there are three vertically elongated openings 76 cut in the shell 10 and each is alined with a slot 78 in the upper surface of the block 30. Chips reaching the upper surface of the block 30 are forced out through the opening 76 by a blast of air directed from an air hose through the top of the chuck and the chip removal process is also aided by the blast of air emanating from the ports 52 each time the chuck is released. It is seen from FIG. 2 that the bottoms of the slots 78 are in line with the bottoms of the slots 76 and from FIG. 3 that one of the ports 52 penetrates the bottom of each of the slots 78.

Having thus described my invention what I claim as new and desire to secure by Letters Patent of the United States is:

1. A chuck for holding a work piece comprising an externally tapered contractable collet, an internally tapered collet operating sleeve, a body in which the sleeve is slidably mounted including a shoulder against which the collet abuts to be closed by the advancing sleeve, a plurality of independent piloted pistons in the body and manifold means through which fluid under pressure is directed to the pistons for urging the pistons to advance the sleeve for closing the collet upon the work piece.

2. A chuck according to claim 1, further comprising adjustable stop means for limiting collet releasing motion of the sleeve including a cone pointed screw threaded into the body, the cone of which engages the sleeve when fluid pressure is relieved, and means for locking the screw in a predetermined position.

3. A chuck for holding a work piece comprising an externally tapered contractable collet, an internally tapered collet operating sleeve, a shell in which the sleeve is slidably mounted including a shoulder against which the collet abuts to be closed by the advancing sleeve, a block formed with a plurality of piston receiving cylinders, a piloted piston in each cylinder and a plate on which the block is mounted, closing an end of the shell and formed with an annular manifold groove through which fluid under pressure is directed to the pistons for urging the pistons to advance the sleeve for closing the collet upon the work piece.

4. A chuck according to claim 3, further characterized in that chip disposal openings are formed in the shell and block.

5. A chuck according to claim 4, in which ports from the cylinders are in communication with the chip disposal openings whereby a blast of air from the ports blows chips out through the openings each time fluid under pressure is applied to the pistons.

6. A chuck according to claim 3, in which the width of the groove is narrower than the diameter of the piston and each of the cylinders is formed with an end wall to provide stops for the pistons in both directions.

References Cited by the Examiner

UNITED STATES PATENTS

| | | | |
|---|---|---|---|
| 2,338,060 | 12/43 | Redmer | 279—50 |
| 2,392,999 | 1/46 | Redmer | 279—4 |
| 3,087,736 | 4/63 | Lukas | 279—4 |

ROBERT C. RIORDON, *Primary Examiner.*